April 17, 1956 L. H. WOLGAST 2,742,610
RESISTANCE MEASURING APPARATUS
Filed Sept. 17, 1952
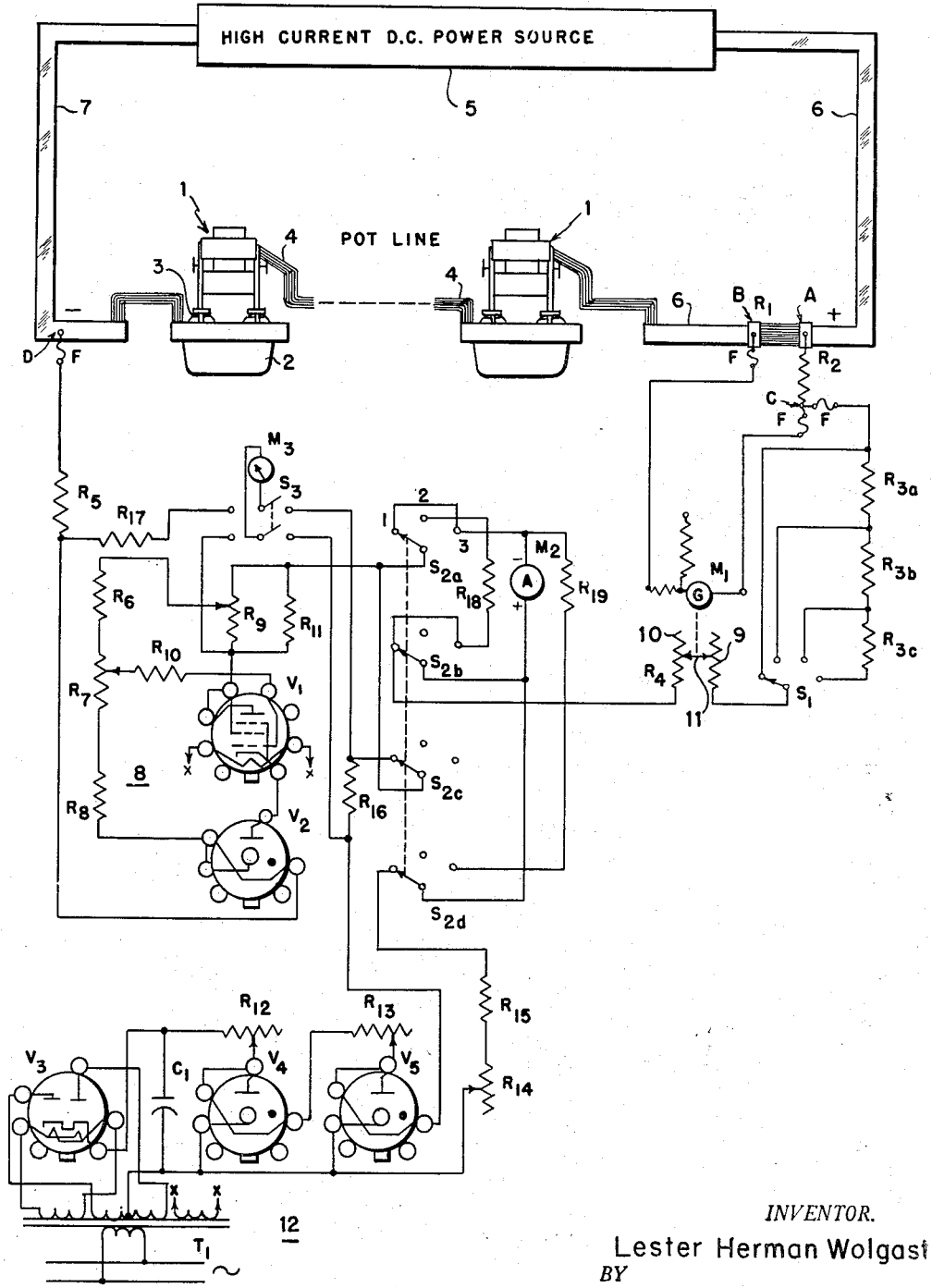
INVENTOR.
Lester Herman Wolgast
BY
Adams, Forward and McLean
ATTORNEYS

United States Patent Office

2,742,610
Patented Apr. 17, 1956

2,742,610

RESISTANCE MEASURING APPARATUS

Lester H. Wolgast, Portland, Oreg., assignor to Reynolds Metals Company, Richmond, Va., a corporation of Delaware Application September 17, 1952, Serial No. 310,015

5 Claims. (Cl. 324—62)

This invention relates to the measurement of the resistance of electrolytic cells. In particular, this invention provides an instrument for the measurement of the electrical resistance of one or more parallel pot lines of one or of a series of electrolytic cells during operation.

In industrial electrochemical processes, for example, in the reduction of alumina to produce aluminum, one of the best indications of the condition of each cell and of the operation of the pot line is the electrical resistance of the pot line. It is therefore highly desirable to provide a reliable, accurate instrument to measure the pot line resistance.

Typical operations on an industrial scale, however, involve electrolytic cells having relatively low impressed voltages driving immense currents. For example, a typical pot line for the production of aluminum having 100 or more cells in series with an impressed voltage in the range of 5 to 7 volts per cell will carry a current of 50,000 amperes or more. It is evident that the resistance of such a pot line is extremely low, on the order of 10 milliohms.

Conventional circuits and resistance measuring instruments are not readily adapted to meter the pot line resistance. Heretofore, however, the Kelvin double bridge circuit has been employed, generally utilizing a low resistance slide wire as the measuring branch of the circuit and including the unknown pot line resistance in the high resistance leg of the bridge. In such instruments a meter shunt, having a resistance on the order of a microhm or less, is inserted in the electrical circuit of the power supply and the pot line and serves as the standard resistance against which the unknown pot line resistance is balanced. Thus the high current power supply for the pot line also supplies the required direct-current voltage to energize the bridge circuit.

Such bridge circuits have, however, certain distinct disadvantages which lessen their value as resistance measuring instruments and limit effective control of pot room operations based on knowledge of resistance of the pot line. Moreover, it is generally desirable to locate the indicating and measuring unit of the instrument at a distance quite remote from the location of the meter shunt in the pot line. Under such circumstances, the lead resistance to the low resistance side of the slide wire forms a substantial portion of the total resistance thereof. Seasonal variations in temperature result in lead resistance variations introducing appreciable errors in the meter reading which are quite noticeable, particularly when using suppressed or expanded meter scales.

Probably a greater variation in the resistance of the low resistance side of the slide wire, however, is introduced by the variations in the resistances of fuses which are essential for meter protection. The various contact resistances, even though kept to a minimum, can also be a constant source of trouble.

Although the Kelvin bridge circuit indicates the true quotient of voltage and current, the instrument lacks stability since the measured resistance value varies with changes in load voltage. It is not unusual when increasing the overall line voltage in an effort to maintain a high load factor that the resistance meter should indicate a lower resistance value.

It is therefore an object of this invention to provide a stable resistance measuring instrument for determining accurately and reliably the resistance of a pot line during operation. A further object of this invention is to provide a resistance measuring instrument which is free of error introduced by variations in lead and fuse resistances. It is also an object of this invention to provide a resistance measuring instrument in which the measuring scale is linear with the measured resistance and directly reflects the actual resistance of the pot line.

The resistance measuring instrument of this invention is a variation of the Wheatstone bridge circuit and employs the conventional arrangement of a low resistance meter shunt of precisely determined value inserted in the electrical connection between one side of the pot line and the impressed voltage of the high current power supply. The meter circuit in its simplest form includes a fixed resistor of precise value, which at one extremity is connected directly to the terminal block of the meter shunt connected with the voltage source. The other extremity of the fixed resistor has a pair of terminals connected directly to it. The balance of the meter circuit includes a variable resistor and a source of constant value direct-current voltage connected in series between one of the pair of terminals mounted on the fixed resistor and the other side of the pot line. Thus, the meter circuit is electrically in parallel with the meter shunt and pot line and in parallel with the power supply for the pot line. The instrument is completed by a null current detecting device, such as a galvanometer, connected between the second of the pair of terminals mounted at one end of the fixed resistor in the meter circuit and the terminal block of the meter shunt connected to the pot line.

It will be seen that the circuit employed resembles the Wheatstone bridge circuit. However, the problem of lead resistance and fuse resistance is eliminated by completing the low resistance branch of the meter circuit in close proximity to the meter shunt. The leads to the rest of the instrument, which may be remotely located, form part of the high resistance branch of the meter circuit and thus constitute only a negligible portion of the total resistance of that circuit and the balancing of the bridge takes place in such high resistance branch. Moreover, necessary fusing may be inserted in such leads. Also, the null current detector may be remotely located with the rest of the meter circuit and, although the long leads from it to the fixed resistor and the meter shunt may form a significant portion of the resistance through the null current detector, such resistance will affect only the sensitivity of the device and has no influence on instrument accuracy since no current flows at balance. Sufficient sensitivity may be provided in the selection of the particular null detecting instrument. Similarly, the null detecting device may also be adequately fused for its protection without detriment to the accuracy of the measurements made.

The problem of contact resistance in this application of the Wheatstone bridge circuit does not exist since the contact resistances of the bolted joints between the meter shunt and the pot line bus bars are of no consequence and merely form part of the effective pot line resistance which is the value to be measured.

A feature of the instrument which is extremely important is the use of the bucking D. C. constant potential in the meter circuit. This is based on the concept that a pot line is essentially a load resistor and a battery of opposite polarity connected in series with the D. C. power supply. In the case of aluminum production, the back voltage is the result of the decomposition voltage of alumina which has been generally established at 1.7 volts per cell, invariant of the condition of the cell. Thus, effective use of the bucking potential in the meter circuit requires a voltage source having an output potential of well regulated constant value equal to the product of the number of electrolytic cells in the pot line and the decomposition voltage of the material undergoing electrolysis in the cells. This output potential should be arranged so that it opposes the voltage of the power supply. As a result, the measuring variable resistor in the meter circuit varies linearly with the actual ohmic resistance of the pot line, thus overcoming the inherent lack of stability of the Kelvin circuit instruments.

In addition, it will be realized that in balanced condition the current flowing through the meter circuit will vary linearly with the current flowing through the pot line and thus a simple low current ammeter may be installed in series with the high resistance branch of the meter circuit to give an indication of the current flowing through the pot line and thus dispense with the need for an ammeter operating in close proximity to the meter shunt in the pot line which must measure extremely high currents at high potentials above ground.

The drawing schematically illustrates a practical form for carrying out my invention as it may be utilized for measuring the resistance of one or more pot lines producing aluminum.

In the drawing a line of pots 1 is electrically connected in series. Each pot 1 comprises a carbon cathode 2 supporting a layer of molten aluminum with a layer of molten cryolite and alumina above the aluminum layer. A carbon anode 3 is supported above cathode 2 with its lower end immersed in the electrolyte layer. The pots 1 are interconnected by bus bars 4 running from the cathode of the first to the anode of the next, and so on down the line.

The power supply 5 for the pot line is any suitable high current medium voltage direct current power supply such as mercury arc rectifiers, D. C. generators, and synchronous rotary converters. The positive voltage from power supply 5 is connected by bus bars 6 to the anode of the first pot 1 in the pot line. Bus bars 7 connect the cathode of the last pot in the pot line to the negative side of power supply 5.

Standard meter shunt $R_1$ is inserted in bus bars 6 by bolted connections at its terminal blocks at junctions A and B. Fixed resistor $R_2$ is bolted to the terminal block of shunt $R_1$ at junction A. The other extremity of resistor $R_2$ is provided with a pair of terminals connected directly to it, indicated by junction C. Null current indicating galvanometer $M_1$ is interconnected between junction B, at the terminal block of meter shunt $R_1$ connected to the anode of the first pot 1 in the pot line, and one of the pair of terminals at junction C.

The operating circuit of the remotely located portion of the instrument is connected between junction point C at the second of the two terminals attached to fixed resistor $R_2$ and junction D on the negative side of the pot line. The operating circuit between junctions C and D principally includes a range selector switch $S_1$ with appropriate resistors $R_{3a}$, $R_{3b}$, and $R_{3c}$ variable resistor $R_4$, four pole-three position rotary selector switch $S_2$, ammeter $M_2$, constant voltage supply 8 and resistor $R_5$ as indicated in the drawing.

Variable resistor $R_4$ includes a pair of slide wires 9 and 10 having roller shunt bar 11 across them. Shunt bar 11 is mechanically controlled by galvanometer $M_1$ so that current flowing from B to C will operate shunt 11 to decrease the resistance value of $R_4$ and, conversely, if current flows from C to B, galvanometer $M_1$ operates shunt bar 11 to increase the resistance of $R_4$.

Range selector switch $S_1$ and its associated tapped resistor $R_3$ are provided to enable selectable operation of variable resistor $R_4$ in any desired resistance range. Since only a small portion of the total scale is needed an additional fixed resistance $R_5$ is included in order to further expand the operating range of the instrument.

Constant voltage source 8 includes a vacuum tube pentode $V_1$ and glow discharge tube $V_2$ connected in series, that is between ammeter $M_2$ and resistor $R_5$.

Although conventional sources of producing a constant voltage source in the meter circuit may be used, such as one or more glow discharge tubes, a battery or a D. C. generator, the illustrated series constant voltage source 8 possesses the unique advantage of being selectably adjustable over a wide range of voltages to give any desired constant voltage drop in a series circuit through which widely varying currents may pass without altering the value of the voltage drop through the unit.

In voltage source unit 8, glow discharge tube $V_2$ maintains a constant series voltage drop which is applied as a positive non-varying bias voltage to the cathode of pentode $V_1$. Resistors $R_6$, $R_7$ and $R_8$ act as a voltage divider network between the potentiometer tap on resistor $R_9$ and the cathode of glow discharge tube $V_2$. The potentiometer tap on resistor $R_7$ applies grid bias to pentode $V_1$ through resistor $R_{10}$. The position of the tap on resistor $R_7$ is adjusted to supply proper grid bias so that the voltage drop in pentode $V_1$ is maintained at the desired value.

If the meter current is increased, the voltage drop of parallel resistors $R_9$ and $R_{11}$ is also increased, thus applying greater voltage to the network of resistors $R_6$, $R_7$ and $R_8$ and thereby making the grid bias on pentode $V_1$ more positive to maintain a constant voltage drop across tube $V_1$ under the increased meter current. Resistor $R_9$ is thus adjustable to a position which will maintain a constant voltage drop across tubes $V_1$ and $V_2$ for any conducting current of glow discharge tube $V_2$. Resistor $R_7$ similarly is adjustable to select any desired constant voltage needed for equalizing the decomposition voltage of the pot line. In setting such adjustments, however, it should be noted that resistors $R_7$ and $R_9$ are not entirely independent of adjustment. Also, resistor $R_9$ is best adjusted by moving roller shunt 11 of resistor $R_4$ from end to end to get a constant voltage.

Ammeter $M_2$ normally is expected to operate over only a small portion of its scale and therefore some method for expanded scale is desirable. Zero suppression may be used, but I prefer to use electrical suppression meter circuit 12 which provides a non-varying current countering the meter circuit current in ammeter $M_2$ so that nearly two-thirds of the scale of the ammeter is suppressed.

Unit 12 is a model EC100 Hastings electronic cell and includes a small D. C. power supply including transformer $T_1$ and full wave rectifier $V_3$. Transformer $T_1$ has an extra filament winding which supplies the filament voltage of pentode $V_1$ in the constant voltage unit 8. Electrical suppression meter circuit 12 also includes a pair of glow discharge tubes $V_4$ and $V_5$ in cascade, and regulating variable resistors $R_{12}$, $R_{13}$, $R_{14}$, as well as current limiting fixed resistor $R_{15}$. The suppression circuit is connected in parallel with ammeter $M_2$ and supplies a constant non-varying current to ammeter $M_2$, bucking the current through the meter.

Double pole-double throw switch $S_3$ is arranged to connect volt meter-ammeter $M_3$ to indicate the current through the electrical suppression meter circuit 12 by means of shunt $R_{16}$ in that circuit and, alternatively, to connect volt meter-ammeter $M_3$ through series resistor $R_{17}$ to read the voltage drop in the constant voltage unit 8.

Four pole-three position rotary selector switch $S_2$ is utilized to connect and disconnect various parts of the meter depending upon the particular operation desired.

Position 1, illustrated, includes all of the preceding circuits.

Position 2 cuts out ammeter $M_2$ and suppression circuit 12 and substitutes therefor equivalent resistor $R_{18}$. The principal use of this position is for testing purposes in order to zero check the meter.

Position 3 cuts the ammeter back into the circuit and equivalent resistor $R_{18}$ out but removes the suppression circuit 12 from operation in order to provide full scale ammeter reading. Resistor $R_{19}$ is a calibrated shunting resistor in parallel with ammeter $M_2$.

In standard operation, with selector switch $S_2$ in the number 1 position, range switch $S_1$ is adjusted so that null balance of galvanometer $M_1$ can be obtained within the moving range of shunt bar 11 of variable resistor $R_4$. Constant voltage unit 8 is adjusted to a voltage drop (indicated by volt meter-ammeter $M_3$) equal to the product of the decomposition voltage alumina (1.7 volts) and the number of cells operating in the pot line at the time. For example, with 130 cells operating, constant voltage unit 8 is adjusted by means of resistor $R_7$ to give a voltage output of approximately 221 volts. Thus, with galvanometer $M_1$ in the null position, the voltage drop across meter shunt $R_1$ will equal the voltage drop across fixed resistor $R_2$, and, therefore, the resistance of the pot line and the resistance of the meter circuit between junction point C and junction point D will bear the same ratio as the quotient of the resistance values of the meter shunt $R_1$ and fixed resistor $R_2$. Thus, the pot line resistance may be determined by the position of roller shunt 11 on variable resistor $R_4$ and by the position of range selector $S_1$. So long as the voltage developed by constant cell 8 is adjusted to equal that of the pot line decomposition voltage, the position of roller shunt 11 on $R_4$ will provide an accurate linear measurement of the ohmic resistance of the pot line. Similarly, at null balance the meter circuit current and the pot line current bear a fixed ratio determined by two fixed resistors $R_1$ and $R_2$. Thus, ammeter $M_2$ will provide an accurate reliable linear measurement of pot line current conveniently located at the control station with the rest of the metering equipment.

Moreover, since galvanometer $M_1$ draws no current at null balance, its leads to points C and B may be as long as are necessary to locate it also at the remote control station. Thus, the pot control room has effective measure of both the pot line resistance and pot line current wherever it is convenient to locate such instruments. Adequate fusing indicated by fuses F may be installed to protect all equipment other than that immediately fixed to the bus bars.

It will be observed that various components of the meter I have described may be omitted, for example, the ammeter and its suppression circuits are not necessary to adequate resistance measuring but represent only an added convenience made possible by the inherent construction of the instrument. Other methods of supplying a bucking voltage may be suitably employed. However, care should be exercised to balance the internal resistance of such means, in order to maintain the accuracy of the instrument. It is not necessary that galvanometer $M_1$ automatically or mechanically correct the value of $R_4$ so that a null balance is obtained. This may be done manually. Conveniently, however, the operation is mechanical and includes a curve drawing instrument indicating the resistance of the pot line plotted against time. Similarly, ammeter $M_2$ is suitably a curve drawing instrument. Other refinements will be obvious such as the use of test switches in various lines.

In selecting the proper values in any given operation, serious consideration should be given to obtaining sufficient meter current to operate ammeter $M_2$ and more important to attain sufficient sensitivity of galvanometer $M_1$. In order to illustrate a typical selection of values in the instrument described, the following circuit element values are suggested by way of example, and are particularly applicable to the measurement of pot line resistances ranging between 2.0 and 11.5 milliohms.

*Electron tubes*

| | |
|---|---|
| $V_1$ | 6V6 |
| $V_2$ | VR 105 |
| $V_3$ | 6X5 |
| $V_4$ | VR 150 |
| $V_5$ | VR 105 |

*Resistors (ohms)*

| | |
|---|---|
| $R_1{}^1$ | $0.419 \times 10^{-6}$. |
| $R_2{}^1$ | 0.838. |
| $R_{3a}{}^1$ | 4K. |
| $R_{3b}{}^1$ | 4K. |
| $R_{3c}{}^1$ | 4K. |
| $R_4{}^1$ | 0–7K. |
| $R_5{}^1$ | 3K. |
| $R_6$ | 1M. |
| $R_7$ | 470K. |
| $R_8$ | 1M. |
| $R_9$ | 1080. |
| $R_{10}$ | 500K. pot. |
| $R_{11}$ | 10K. pot. |
| $R_{12}$ | 0–5K. |
| $R_{13}$ | 0–5K. |
| $R_{14}$ | 0–1K. |
| $R_{15}$ | 4.7K. |
| $R_{16}{}^1$ | 25 ma. shunt. |
| $R_{17}$ | 250K. |
| $R_{18}$ | 26. |
| $R_{19}$ | 13. |

[1] Precision resistors.

*Condenser (microfarads)*

| | |
|---|---|
| $C_1$ | 4 |

Although I have illustrated the application of my invention in a pot line producing aluminum, it will be evident that the principles underlying my invention are equally applicable to the measurement of resistance in other electrochemical operations also involving large currents and low resistances.

I claim:

1. An instrument for measuring the electrical resistance of a pot line of electrolytic cells having a D. C. potential impressed thereon which comprises, in combination with the pot line; a direct current power source electrically connected therewith through a fixed low resistance meter shunt; a meter circuit electrically connected in parallel with said meter shunt and said pot line including a fixed resistor having one extremity electrically connected directly to said meter shunt at the terminal block of said shunt connected to said power source and having a pair of terminals electrically connected directly to the other extremity of the fixed resistor, a direct-current constant voltage source having an output potential equal to the product of the number of electrolytic cells in said pot line and the decomposition voltage of the material undergoing electrolysis in said cells and opposing the output potential of said power source, and a variable resistor electrically connected in series with said constant voltage source between the first of said pair of terminals and the end of said pot line opposite said shunt which variable resistor serves as a means for measuring the electrical resistance of the pot line; and a null current detecting device connected between the terminal block of said shunt electrically connected to said pot line and the second of said pair of terminals in said meter circuit.

2. An instrument according to claim 1 in which the meter circuit includes a current measuring device connected in series therewith.

3. An instrument according to claim 1 in which the meter circuit includes a current measuring device connected in series therewith, and a source of constant current connected in parallel with said current measuring device bucking the current through said meter circuit.

4. An instrument according to claim 1 in which the voltage source in said meter circuit includes a glow discharge tube.

5. An instrument according to claim 1 in which the voltage source in said meter circuit includes a glow discharge tube and a grid controlled vacuum tube connected in series in said meter circuit.

References Cited in the file of this patent

UNITED STATES PATENTS 1,237,559   Sano _____ Aug. 21, 1917

OTHER REFERENCES

"Self Balancing Resistance Bridge," an article in General Electric Review of October 1949 (pages 45, 56).